United States Patent
Liu

(10) Patent No.: US 9,147,017 B2
(45) Date of Patent: Sep. 29, 2015

(54) VERIFICATION SUPPORT METHOD, RECORDING MEDIUM HAVING STORED VERIFICATION SUPPORT PROGRAM THEREIN, AND VERIFICATION SUPPORT APPARATUS

(71) Applicant: FUJITSU LIMITED, Kawasaki (JP)

(72) Inventor: Yu Liu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 14/276,493

(22) Filed: May 13, 2014

(65) Prior Publication Data

US 2014/0365984 A1 Dec. 11, 2014

(30) Foreign Application Priority Data

Jun. 11, 2013 (JP) .................................. 2013-122787

(51) Int. Cl.
*G06F 17/30* (2006.01)
*G06F 17/50* (2006.01)
*H01L 27/118* (2006.01)

(52) U.S. Cl.
CPC ........ *G06F 17/5009* (2013.01); *G06F 17/5081* (2013.01); *G06F 2217/10* (2013.01); *G06F 2217/12* (2013.01)

(58) Field of Classification Search
CPC ......... G06F 17/30; G06F 17/50; H01L 27/02; H01L 27/118; H01L 23/481
USPC .............. 716/54, 56, 111, 132; 257/206, 118, 257/401, 481
See application file for complete search history.

(56) References Cited

U.S. PATENT DOCUMENTS 8,453,102 B1 * 5/2013 Pack et al. ..................... 716/139
2006/0206851 A1 * 9/2006 Van Wingerden et al. ...... 716/19

(Continued)

FOREIGN PATENT DOCUMENTS

JP 11-306230 11/1999
JP 2004-094402 3/2004

OTHER PUBLICATIONS

Xin Li et al., "Statistical Regression for Efficient High-Dimensional Modeling of Analog and Mixed-Signal Performance Variations", Design Automation Conference 2008, pp. 38-43, Jun. 2008.

(Continued)

*Primary Examiner* — Jack Chiang
*Assistant Examiner* — Mohammed Alam
(74) *Attorney, Agent, or Firm* — Staas & Halsey LLP

(57) ABSTRACT

A verification support apparatus for an integrated circuit. The apparatus includes; a combination acquisition unit configured to acquire different combinations of a variable value regarding variation in an integrated circuit manufacturing process and a performance value obtained from a simulation of a circuit; a function acquisition unit configured to acquire a functional relationship from which a performance value of a circuit is obtained by giving a parameter value; a difference calculation unit configured to calculate a difference between the performance value obtained by the functional relationship and the performance value included in the combination; an expected value calculation unit configured to determine a probability based on random numbers and execute a calculation process in which an expected value of the difference is calculated based on the determined probability and the difference calculated by the difference calculation unit a predetermined number of times; and a goodness of fit calculation unit configured to calculate a goodness of fit (GF) between the simulation and the functional relationship.

7 Claims, 16 Drawing Sheets

(56) References Cited

U.S. PATENT DOCUMENTS

| | | | |
|---|---|---|---|
| 2008/0034337 A1* | 2/2008 | Kuemerle et al. | 716/6 |
| 2009/0031268 A1* | 1/2009 | Miranda et al. | 716/6 |
| 2009/0031271 A1* | 1/2009 | White et al. | 716/10 |
| 2012/0198393 A1* | 8/2012 | Taoka | 716/51 |
| 2013/0246986 A1* | 9/2013 | Kuo et al. | 716/106 |

OTHER PUBLICATIONS

Xin Li, "Finding Deterministic Solution from Underdetermined Equation: Large-Scale Performance Modeling by Least Angle Regression", Design Automation Conference 2009, pp. 364-369, Jul. 2009.

Bradley Efron et al., "Least Angle Regression", The Annals of Statistics 2004, vol. 32, No. 2, pp. 407-499, Institute of Mathmatical Statistics, 2004.

Robert Tibshirani, "Regression Shrinkage and Selection via Lasso", Journal of the Royal Statistical Society. Series B(Methodological), vol. 58, No. 1, pp. 267-288, 1996.

* cited by examiner

ΔP1_post= ΔM1_post_vth × a1+ ΔM2_post_vth × a3
ΔP2_post= ΔM1_post_vth × a1+ ΔM2_post_vth × a3+ ΔM2_post_L × a4
: :
ΔP5_post= ΔM1_post_vth × a1+ ΔM2_post_vth × a3+ ΔR1_post × a5

800 CANDIDATE MODEL GROUP

*FIG. 9*

$$E2 = \begin{bmatrix} \Delta d\_post\_(m-n+1) \\ \vdots \\ \Delta d\_post\_m \end{bmatrix} - \begin{bmatrix} \Delta M1\_post\_vth\_(m-n+1) & \cdots & \Delta C1\_post\_(m-n+1) \\ \vdots & \vdots & \vdots \\ \Delta M1\_post\_vth\_m & \cdots & \Delta C1\_post\_m \end{bmatrix} \times \begin{bmatrix} a1 \\ \vdots \\ a3 \\ \vdots \\ a4 \\ 0 \end{bmatrix}$$

$\Delta P2\_post = \Delta M1\_post\_vth \times a1 + \Delta M2\_post\_vth \times a3 + \Delta M2\_post\_L \times a4$

VERIFICATION SUPPORT METHOD, RECORDING MEDIUM HAVING STORED VERIFICATION SUPPORT PROGRAM THEREIN, AND VERIFICATION SUPPORT APPARATUS

CROSS-REFERENCE TO RELATED APPLICATION

This application is based upon and claims the benefit of priority from the prior Japanese Patent Application No. 2013-122787 filed on Jun. 11, 2013, the entire contents of which are incorporated herein by reference.

FIELD

The embodiments discussed herein are related to a verification support method, a recording medium having stored therein a verification support program, and a verification support apparatus.

BACKGROUND

A technology has been known in which simulation is performed using a circuit model representing an analog integrated circuit to verify the analog integrated circuit thereby evaluating the performance of the analog integrated circuit. See, for example, Japanese Laid-open Patent Publication No. 11-306230 and Japanese Laid-open Patent Publication No. 2004-94402.

Further, another technology has been known in which a functional relationship is generated by giving the value of a variable regarding the variation of an integrated circuit manufacturing process to the functional relationship to obtain a performance value of the analog integrated circuit in the verification of the analog integrated circuit, in order to analyze the performance variation of the analog integrated circuit out of the variations in a semiconductor integrated circuit manufacturing process which manufactures the analog integrated circuit. See, for example, the non-patent literature 1 entitled "Statistical Regression for Efficient High-Dimensional Modeling of Analog and Mixed-Signal Performance Variations", appeared in Design Automation Conference, 2008, p. 38-43 Xin Li et al, and another non-patent literature 2 entitled "Finding Deterministic Solution from Underdetermined Equation: Large-Scale Performance Modeling by Least Angle Regression", appeared in Design Automation Conference, 2009, p. 364-369, Xin Li.

The simulation for analyzing the variations on the performance of the analog integrated circuit, especially for the variations on the performance of the post-layout circuit, is known to be very heavy and thus, a sufficient accuracy of analysis may not be obtained within a scheduled completion date for verification, which is problematic. In the non-patent literature 2, the performance variation model may be created using only parameters that sufficiently influence on the variations on the performance to run a simulation having a good balance between the accuracy of the analysis and time. However, when the number of times to run simulation (hereinafter, referred to as "the number of simulation runs") is extremely low, it is hard to evaluate whether the functional relationship is suitable for the simulation with a high accuracy due to the difference between respective performance values obtained by the functional relationship and the simulation. In the meantime, it takes time to increase the number of simulation runs. Accordingly, there is a problem that it is hard to efficiently evaluate whether the functional relationship is suitable for the simulation.

SUMMARY

According to an aspect of the embodiment, a verification support apparatus includes a combination acquisition unit configured to acquire a plurality of different combinations of a variable value regarding variation in an integrated circuit manufacturing process and a performance value obtained from a simulation of a circuit based on the variable value; a function acquisition unit configured to acquire a functional relationship from which a performance value of the circuit is obtained by giving a parameter value to the functional relationship; a difference calculation unit configured to calculate a difference between the performance value obtained by giving the variable value included in the combination to the functional relationship acquired by the function acquisition unit and the performance value included in the combination regarding each of the plurality of combinations acquired by the combination acquisition unit; an expected value calculation unit configured to determine a probability based on random numbers regarding each of the plurality of combinations and execute a calculation process in which an expected value of the difference is calculated based on the determined probability and the calculated difference a predetermined number of times which is larger than the number of the plurality of combinations; and a goodness of fit calculation unit configured to calculate a goodness of fit (GF) between simulation and the functional relationship based on each expected value calculated by executing the calculation process by the expected value calculation unit the predetermined number of times.

The object and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

BRIEF DESCRIPTION OF DRAWINGS

FIG. 9 is an explanatory view illustrating an exemplary difference calculation.

DESCRIPTION OF EMBODIMENTS

Hereinbelow, exemplary embodiments of a verification support method, a verification support program and a verification support apparatus according to the present disclosure will be described with reference to the drawings in detail.

Figure 1:
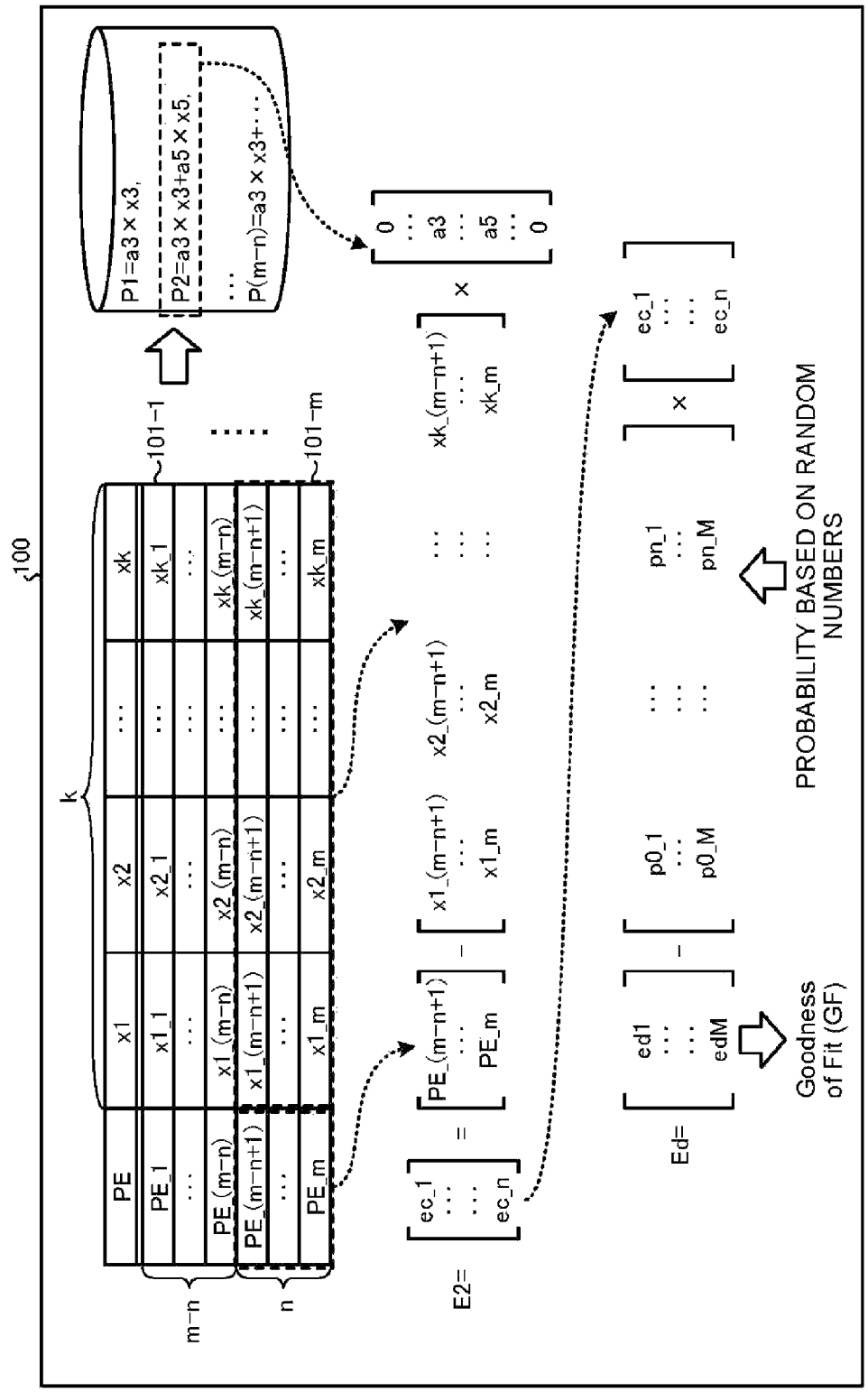
FIG. 1 is an explanatory view illustrating an exemplary operation by a verification support apparatus.

FIG. 1 is an explanatory view illustrating an exemplary operation by a verification support apparatus. The verification support apparatus 100 maybe a computer system which supports the verification of a designed circuit. First, the verification support apparatus 100 acquires a plurality of different combinations 101-1 through 101-m of the variable values regarding the variation in an integrated circuit manufacturing process and the performance value of the circuit obtained from a simulation of the circuit based on the variable values. The variables regarding the variation in the integrated circuit manufacturing process are the variables indicating the characteristics of each element of the circuit. For example, when the element is a transistor, the variables indicate, for example, a channel length, a threshold voltage and an oxide film thickness. Further, when the element is a capacitor, the variables indicate, for example, a capacitance. When the element is a resistor, for example, the variables indicate a resistance. Here, the variables are called parameters. The simulation of the circuit refers to, for example, a simulation of a circuit model indicating a circuit set with parameters using the SPICE. Further, the performance value may be the performance value itself and otherwise, a difference value between the performance value and an average value of the performance values. The average value of the performance value is a value obtained from the simulation of the circuit. In the example of a combination 101, the performance value is PE and k parameters are x1–xk.

The verification support apparatus 100 acquires a functional relationship from which a performance value of a circuit may be obtained by giving a value of parameter to the functional relationship. The functional relationship may be called a model. For example, a plurality of models may be acquired. Further, the verification support apparatus 100 creates the plurality of models based on each of some combinations among a plurality of combinations 101-1 through 101-m. In the example of FIG. 1, the verification support apparatus 100 creates the number of (m−n) models P1–P(m−n) based on the number of (m−n) combinations 101-1 through 101-(m−n).

Subsequently, the verification support apparatus 100 calculates the difference between the performance value obtained by giving the value of parameter included in the combination 101 to the acquired model P and the performance value included in the combination 101 regarding each of a plurality of combinations 101-(m−n+1) through 101-m. A model P2 is given as an example in FIG. 1. For example, the verification support apparatus 100 subtracts the result of multiplication of a matrix of the parameter values included in the combination 101 and a matrix of coefficients of the model P2 from the matrix of the performance values included in the combination 101. The result of subtraction is E2.

The verification support apparatus 100 determines the probability p based on random numbers regarding each of n combinations 101-(m−n+1)-101-m and executes a calculation process in which an expected value of a difference is calculated based on the determined probability p and the calculated difference a predetermined number of times M. The value of the probability p ranges from zero (0) to one (1). The total value of each row of the probability matrix becomes one (1). The predetermined number of times M is a larger number than the number m of the combinations and is determined by, for example, the user of the verification support apparatus 100. Also, the verification support apparatus 100 calculates a Goodness of Fit (GF) between the simulation and the model based on each of the expected values calculated by executing the calculation process the predetermined number of times M. In the example of FIG. 1, the GF regarding the model P2 is calculated.

Accordingly, the GF, with which the model P may be statistically evaluated, may be obtained even when the number of simulation runs is small and thus, the evaluation accuracy as to whether the model P is suitable for the simulation may be improved in a case where the number of simulation runs is small. Therefore, it is possible to improve the evaluation efficiency.

Here, brief descriptions will be made on a designing procedure in a case where a circuit to be subjected to the designing is an analog circuit. The first process of the designing procedure includes a process in which a circuit topology is determined and also a parameter which indicates a characteristic of element is determined. The circuit topology refers to a method of connecting the elements with each other. Hereinafter, the information which indicates the method of connecting the elements with each other is defined as a circuit model. The second process of the designing procedure includes a process in which a circuit design determined at the first process is verified to determine as to whether the circuit design satisfies a specification.

The third process of the designing procedure includes a process in which a layout processing is performed when the circuit design is determined to be satisfied the specification at the second process. The layout processing is performed and thus a parasitic element of a layout is included in the circuit information. The parasitic elements of the layout are, for example, a wiring capacitor or a wiring resistor of the layout.

The fourth process of the designing procedure includes a process in which a physical verification on the circuit information is performed after the layout processing. The physical verification includes, for example, DRC (Design Rule Check) or LVS (Layout Versus Schematic).

The fifth process of the designing procedure includes a process in which a determination is made as to whether the performance value of the circuit satisfies the specification of variation regarding the circuit information having been subjected to the physical verification. In the fifth process, a circuit is manufactured by the manufacturing process according to the circuit information determined to be that the performance value of the circuit satisfies the variation specification. Further, the reason for determining as to whether the variation specification is satisfied is that when a process is finely divided, the performance varies, and when the variation becomes large, the number of circuits that have a performance value that becomes out of a specification range increases and thus, the manufacturing yield decreases. The performance values are different from each other depending on, for example, the kind of circuit, but may include an oscillation frequency or a delay amount. For example, the values of the oscillation frequency of the circuit obtained from a simulation are the same but the values of the oscillation frequency of the circuit which are actually manufactured may be different for each circuit and become varied values. Therefore, it is possible to suppress the performance value from being out of the specification range by performing the fifth process.

The model P regarding the variation in the post-layout circuit is created to clarify a performance variation source in order to analyze the performance variation. The performance variation source is clarified to improve the manufacturing yield. In the embodiment, the GF with which the model P may be statistically evaluated is obtained even when the number of simulation is small.

(Exemplary Hardware Configuration of the Verification Support Apparatus 100)

Figure 2:
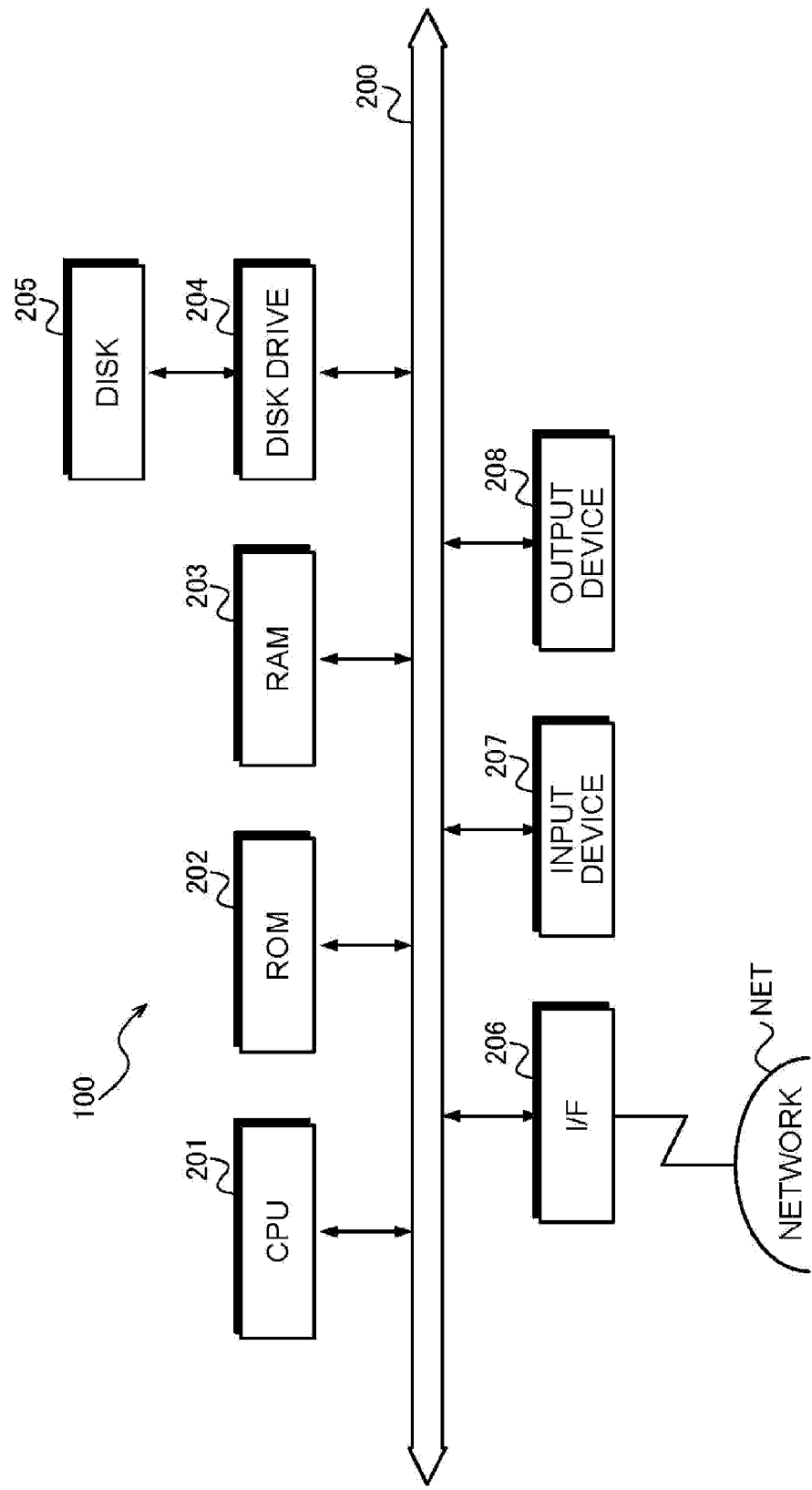
FIG. 2 is a block diagram illustrating an exemplary hardware configuration of the verification support apparatus.

FIG. 2 is a block diagram illustrating an exemplary hardware configuration of the verification support apparatus. The verification support apparatus 100 includes, for example, a Central Processing Unit (CPU) 201, a Read Only Memory (ROM) 202, a Random Access Memory (RAM) 203, a disk drive 204 and a disk 205. The verification support apparatus 100 also includes an interface (IF) 206, an input device 207 and an output device 208. Further, respective components are connected with each other via a bus 200.

Here, the CPU 201 serves to control the entirety of the verification support apparatus 100. The ROM 202 stores, for example, a booting program. The RAM 203 is a storage unit used as a work area of the CPU 201. The disk drive 204 controls the read/write operation of data from/to the disk 205 according to the control of the CPU 201. The disk 205 stores data recorded according to the control by the disk drive 204. The disk 205 may include, for example, a magnetic disk or an optical disk.

The I/F 206 is connected to a network NET, such as a Local Area Network (LAN), a Wide Area Network (WAN), or the Internet, through a communication line and connected to other devices through the network NET. Also, the I/F 206 serves to implement an internal interface with the network NET and controls the input/output operation of the data from an external device. A device such as a modem or a LAN adaptor may be adopted in the I/F 206.

The input device 207 is an interface such as a keyboard, a mouse or a touch panel, which inputs various data by manipulation of a user. Further, the input device 207 may receive an image or moving images from a camera. Further, the input device 207 may receive a voice from a microphone. The output device 208 is an interface which outputs data according to the instruction from the CPU 201. The output device 208 may include a display or a printer.

(Example of a Circuit Before and after the Layout Processing)

Figure 3:
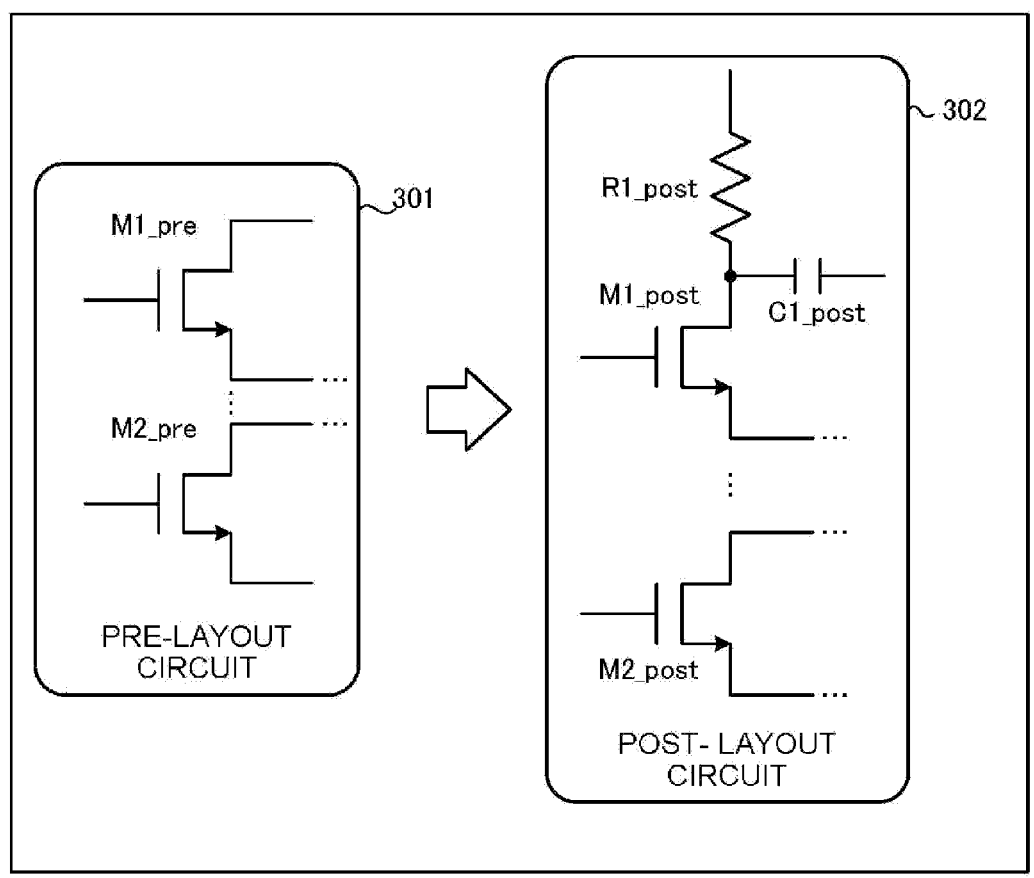
FIG. 3 is an explanatory view illustrating an exemplary circuit before and after a layout processing.

FIG. 3 is an explanatory view illustrating an exemplary circuit before and after the layout processing. Here, the target circuit to be designed before the layout processing is called a pre-layout circuit 301, and the target circuit to be designed after the layout processing is called a post-layout circuit 302.

For example, the pre-layout circuit 301 illustrated in FIG. 3 includes a transistor M1_pre and a transistor M2_pre. Further, the post-layout circuit 302 having been subjected to the layout processing based on the pre-layout circuit 301 includes, for example, a wiring capacitor C1_post and a wiring resistor R1_post in addition to a transistor M1_post and a transistor M2_post.

The post-layout circuit 302 includes elements and thus, the number of elements of the post-layout circuit 302 may be drastically increased compared to the pre-layout circuit 301.

Further, the characteristic of each element varies due to a factor inherent in the element as well as a factor common to the element. Therefore, the number of parameters becomes large in the post-layout circuit 302.

(Exemplary Functional Configuration of the Verification Support Apparatus 100)

Figure 4:
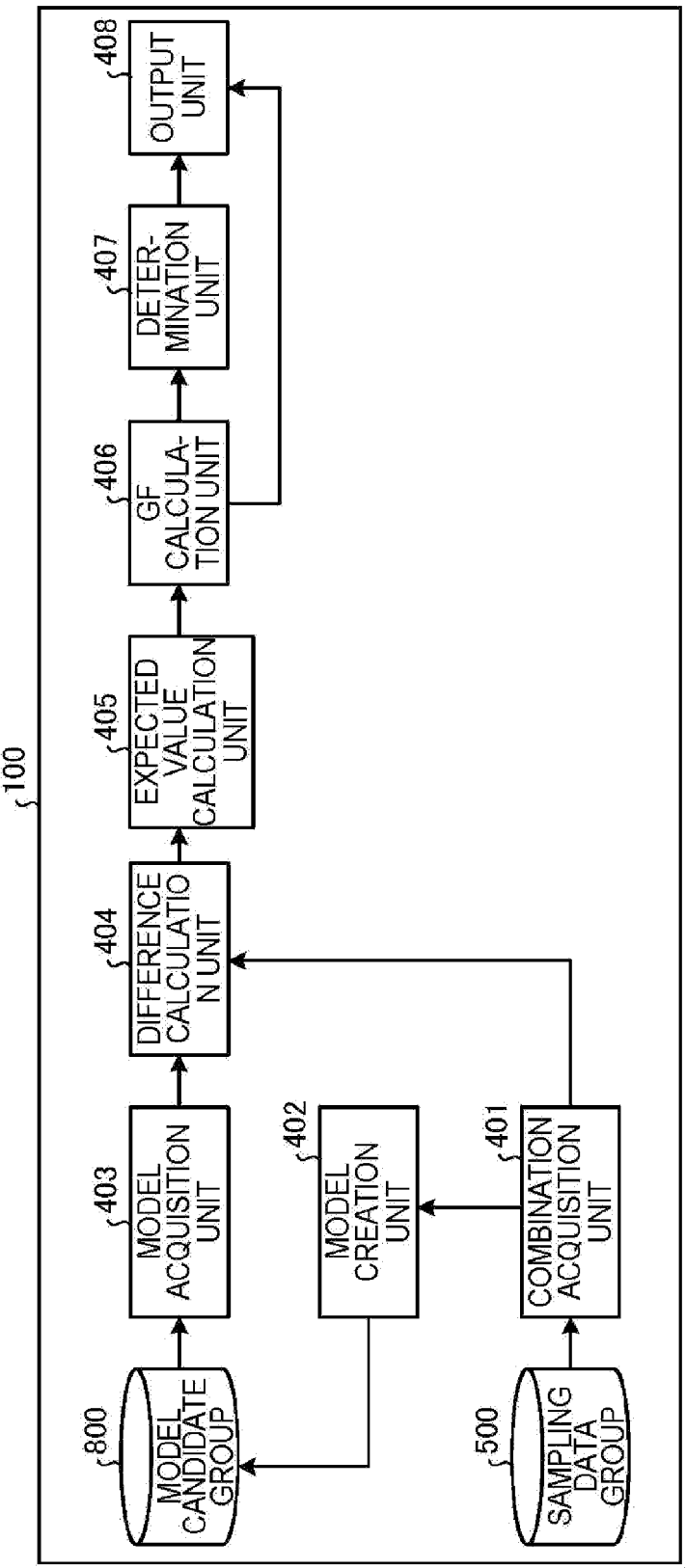
FIG. 4 is a block diagram illustrating an exemplary functional configuration of the verification support apparatus.

FIG. 4 is a block diagram illustrating an exemplary functional configuration of the verification support apparatus. The verification support apparatus 100 includes, for example, a combination acquisition unit 401, a model creation unit 402, a model acquisition unit 403, a difference calculation unit 404, an expected value calculation unit 405, a GF calculation unit 406, a determination unit 407, and an output unit 408. The processes performed on a processing route spanning from the combination acquisition unit 401 to the output unit 408 are coded in the verification support program stored in a storage device, such as, the ROM 202, the RAM 203, or the disk 205. The CPU 201 reads the verification support program from the storage device to execute a process coded in the verification support program such that the processes performed on a processing route spanning from the combination acquisition unit 401 to the output unit 408 is implemented. The CPU 201 may read the verification support program from the network NET through the I/F 206.

The combination acquisition unit 401 acquires a plurality of different combinations of a variable value regarding the design of the post-layout circuit 302 and a performance value of the post-layout circuit 302 obtained from the simulation of the post-layout circuit 302 based on the variable value. The performance value may be either a performance value itself or a difference value between the performance value and an average value of the performance values.

(Example of Combination)

Figure 5:
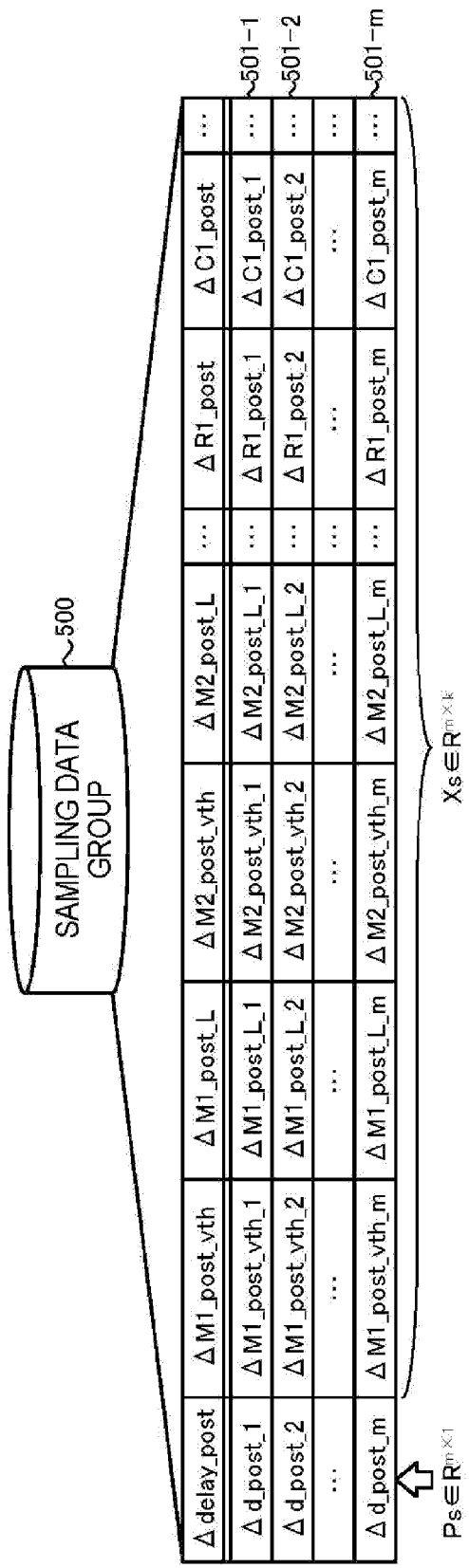
FIG. 5 is an explanatory view illustrating examples of combinations.

FIG. 5 is an explanatory view illustrating exemplary combinations. In the example of FIG. 5, the amount of delay is given as an example of the performance value of the post-layout circuit 302. The symbol "Δ" indicates a difference value from the performance value and the average value of the performance values, and is called a "deviation". The sampling data group 500 includes a deviation of the sampled performance value and a deviation of value of each of a plurality of parameters. Information is set in each field of the sampling data group 500 and thus, a plurality of combinations 501-1-501-m is registered as records. The deviation of the sampled delay amount is set in a field for Δdelay_post. Here, the sampled performance value is a value obtained from a simulation. The deviation of the parameter value is set in a field for parameter.

Parameters are, for example, $\Delta M1\_post\_vth$, $\Delta M1\_post\_L$, $\Delta M2\_post\_vth$, $\Delta M2\_post\_L$, $\Delta R1\_post$ or $\Delta C1\_post$. The $\Delta M1\_post\_vth$ is a parameter which indicates the threshold voltage vth of the transistor M1. The $\Delta M1\_post\_L$ is a parameter which indicates the channel length L of the transistor M1. The $\Delta M2\_post\_vth$ is a parameter which indicates the threshold voltage vth of the transistor M2. The $\Delta M2\_post\_L$ is a parameter which indicates the channel length L of the transistor M2. The $\Delta R1\_post$ is a parameter which indicates the value of a resistor R1. The $\Delta C1\_post$ is a parameter which indicates the value of a capacitor C1. The value of the parameter may be generated using random numbers or may be set by a user of the verification support apparatus 100.

Further, the sampled performance value may be obtained from the simulation using, for example, the SPICE in which the value which is set in the parameter field is given to the circuit model which indicates the post-layout circuit 302 as the value of parameter.

A set of performance values is indicated as "Ps" and a set of parameter values is indicated as "Xs". Here, Ps∈Rm×1 and Xs∈Rm×k. The symbol "R" indicates a real number.

Figure 6:
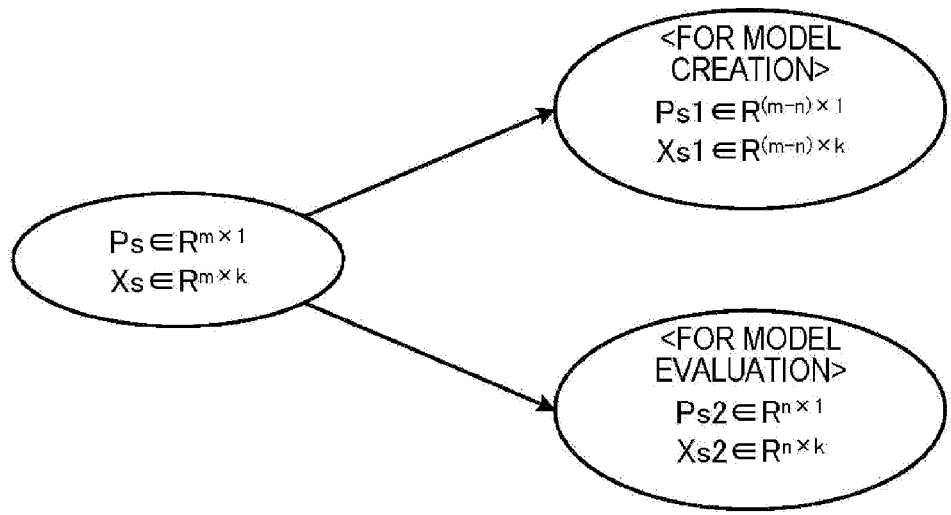
FIG. 6 is an explanatory view illustrating an exemplary discrimination for creating a model and evaluating a model.

FIG. 6 is an explanatory view illustrating an exemplary discrimination for creating a model and for evaluating a model. In the embodiment, some combinations 501 of a plurality of combinations 501 are used for creating a model and the remaining combinations 501 are used for evaluating the model using a technique called the Cross-Validation.

In an example of FIG. 6, (m−n) combinations 501 are used for creating a model and n combinations 501 are used for evaluating the model among "m" combinations 501. In FIG. 6, the R indicates a real number. The Ps indicates m performance values included in the m combinations 501. The Xs indicates m×k kinds of parameters that are included in the m combinations 501. The Ps1 indicates (m−n) performance values included in the (m−n) combinations 501 among the m combinations 501. The Xs1 indicates (m−n)×k kinds of parameters that are included in the "m−n" combinations 501 among "m" combinations 501. The Ps2 indicates the n performance values included in the n combinations 501 among the m combinations 501. The Xs2 indicates n×k kinds of parameters that are included in the n combinations 501 among the m combinations 501.

More specifically, for example, in 5-Folder Cross-Validation, forty (40) combinations 501 are used for creating a model and ten (10) combinations 501 are used for evaluating the model among fifty (50) combinations 501.

(Creation Example of a Candidate Model)

Figure 7:
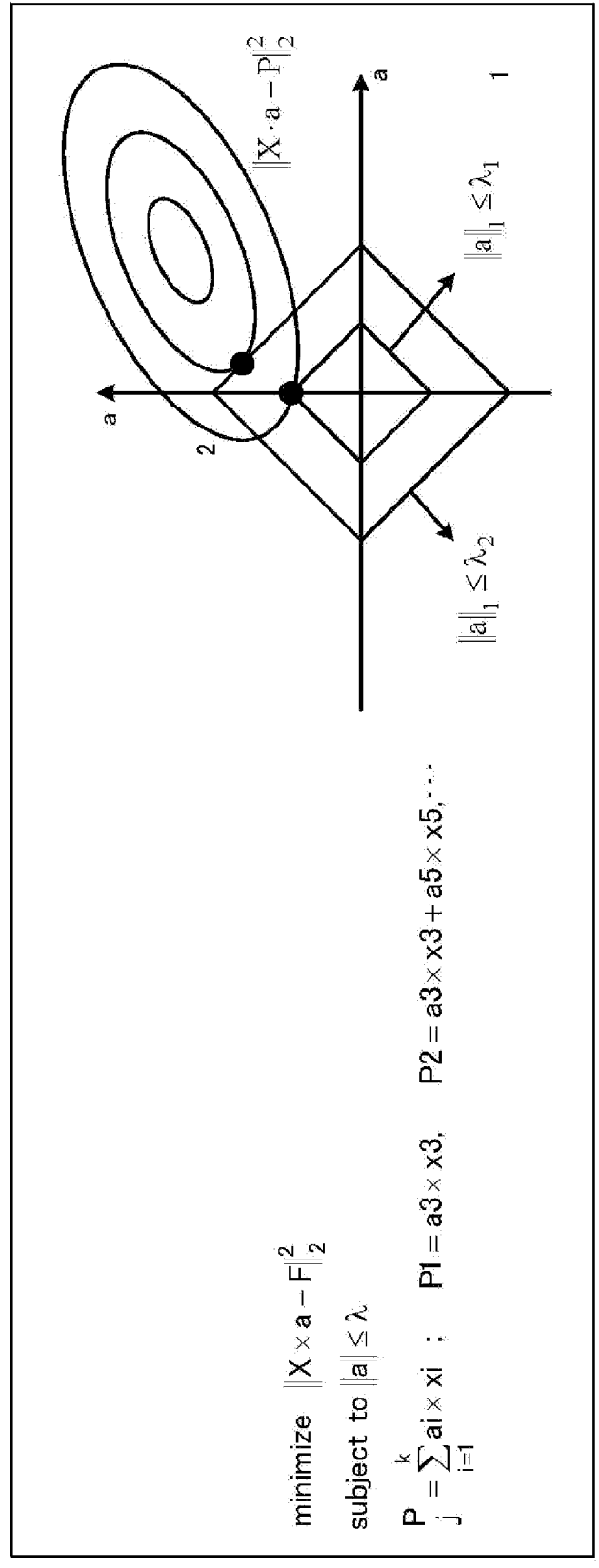
FIG. 7 is an explanatory view illustrating an exemplary creation of a candidate model.

FIG. 7 is an explanatory view illustrating an exemplary creation of a candidate model. The model creation unit 402 creates a candidate model P using Sparsity characteristic based on the acquired sampling data group 500. The candidate model P created in this example is a candidate model for which a deviation between the performance value and the average value of the performance values may be statistically calculated. The Sparsity characteristic is a characteristic that the parameters which influence on the performance of the post-layout circuit 302 are only a part of the entire parameters.

The degree of the Sparsity characteristic may be represented by the ratio of sampling data and parameters that influence on the performance. The method using the Sparsity characteristic may include, for example, LAR (Least Angle Regression) or LASSO (Least Absolute Shrinkage and Selection Operator). Regarding the LAR, please refer to, for example, "LEAST ANGLE REGRESSION", The Annals of Statistics 2004, Vol. 32, No. 2, 407-499, Institute of Mathematical Statistics, 2004, BRADLEY EFRON and three others. Regarding the LASSO, please refer to, for example, "Regression Shrinkage and Selection via the Lasso", Journal of the Royal Statistical Society. Series B (Methodological), Volume 58, Issue 1 (1996), 267-288, Robert Tibshirani.

For example, the model creation unit 402 sequentially creates the candidate model P, for which the number of parameters that influence on a performance value is increased, from the correlation between the parameters. The coefficients are calculated by a fitting method. The parameters which influence on the performance value are different depending on a kind of performance value, such as an oscillation frequency or a delay amount.

For example, the candidate model P is expressed by the sum of a multiplication result of coefficient "a" and parameter "x". For example, the candidate model P1 is expressed only by the multiplication result of coefficient a3 and parameter x3, but other parameters of the candidate model P1 are omitted because coefficients of other parameters are zero (0). For example, the candidate model P2 is expressed by the sum of a multiplication result of coefficient a3 and parameter x3 and a multiplication result of coefficient a5 and parameter x5.

The candidate model P may become more suitable for simulation as the number of parameters or coefficients becomes larger. On the other hand, the parameter or the coefficient may be attuned even to an accidental variation of, for example, noise, and thus, an overfitting may occur in which the parameters or the coefficient becomes unsuitable for the combination 501 other than the combination 501 for creating the model. The accidental change indicates the change unrelated to a structure of a target model to be measured. Further, for example, in a case where the candidate model P becomes more suitable for a simulation as the degree of the Sparsity characteristic becomes larger, that is, the candidate model P becomes to have the larger number of coefficients that are zero (0), when the candidate model P having the small number of coefficients of parameters that are not 0 (zero), an overfitting occurs. For example, it is assumed that the values of one thousand (1,000) coefficients are all 0.001 and the value of one (1) coefficient is one (1) in a certain candidate model P. The parameters occur randomly and thus, all of the coefficients of the parameters may become one (1) incidentally. In this case, the sum of one thousand (1,000) coefficients having the value of 0.001 is 1000×0.001 though the parameter having the coefficient of one (1) influences on the performance value the most. Therefore, the influence by the parameters having one thousand (1,000) coefficients of 0.001 becomes equal to the influence by the parameter having the coefficient of one (1). Therefore, the model creation unit 402 creates a plurality of candidate models P. Further, the model creation unit 402 creates the candidate model P for each combination 501.

(Example of Candidate Model Group)

Figure 8:
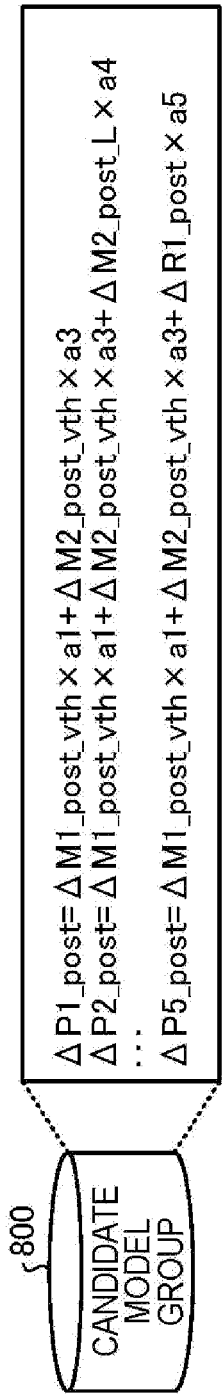
FIG. 8 is an explanatory view illustrating an example of a candidate model group.

FIG. 8 is an explanatory view illustrating an example of a candidate model group. The candidate model group 800 is stored in a storage device such as, for example, the disk 205. In an example of FIG. 8, the parameter having the coefficient of zero (0) will be omitted. For example, n is five (5) and five kinds of the candidate models P exist.

A candidate model ΔP1_post may obtain the performance value using two parameters that are ΔM1_post_vth and ΔM2_post_vth. A candidate model ΔP2_post may obtain the performance value using three parameters that are ΔM1_post_vth, ΔM2_post_vth and ΔM2_post_L. A candidate model ΔP5_post may obtain the performance value using three parameters that are ΔM1_post_vth, ΔM2_post_vth and ΔR1_post.

The model acquisition unit 403 acquires the candidate model group 800. An acquisition scheme may include, for example, reading out the candidate model group 800 stored in the storage device such as, for example, the disk 205 or receiving an input of the candidate model group 800 through the input device 207.

The difference calculation unit 404 calculates the difference between the performance value obtained by giving the variable value included in the combination 501 to the acquired candidate model P and the performance value included in the combination 501 regarding each of a plurality of combinations 501 acquired by the combination acquisition unit 401a. Specifically, the difference calculation unit 404 calculates the difference based on the following Equation (1).

$$Ec = Ps2 - Xs2 \times Ac \qquad (1)$$

Ps2∈Rn×1
Xs2∈Rn×k

In the Equation (1), Ps2 indicates n performance values included in n combinations 501 among m combinations 501. Xs2 indicates n×k types parameters included in n combinations 501 among m combinations 501. Ac indicates a coefficient matrix of c (c=1 through (m−n))-th candidate model P. Ec indicates the difference between the performance value obtained from the simulation and the performance value obtained from the c-th candidate model P.

FIG. 9 is an explanatory view illustrating an exemplary difference calculation. The example of FIG. 9 represents the difference between the performance value obtained by giving the value of variable to the candidate model ΔP2_post and the performance value obtained from the simulation.

The expected value calculation unit 405 determines a probability based on random numbers regarding each of the plurality of combinations 501 and executes a calculation process a predetermined number of times in which an expected value of the difference is calculated based on the determined probability and the difference calculated by the difference calculation unit 404. The predetermined number of times is a larger number than the number of the plurality of combinations 501. It is assumed that the predetermined number of times and the number of expected values of difference are denoted by M. The predetermined number of times may be determined by, for example, a user. The predetermined number of times is stored in a storage unit such as, for example, the RAM 203 or the disk 205. Specifically, the expected value calculation unit 405 calculates M expected values of difference using the Bayesian Bootstrap. For example, it may be one thousand (1,000) times. The expected value is also the average value. The Bayesian Bootstrap does not simulate the frequency of the performance value obtained from simulation but simulates the posterior probability distribution.

For example, the expected value calculation unit 405 determines a probability POST (POST∈RM×n) based on M×n random numbers, where R indicates a real number. Subsequently, the expected value calculation unit 405 calculates M expected values of difference denoted by Emc (emc1 emcM) using the following Equation (2).

$$Emc = POST \times Ec \quad (2)$$

Emc∈RM×1

Further, the expected value calculation unit 405 generates 1×n matrix without generating M×n matrix regarding the probability POST to calculate the expected value Emc by iteratively performing the calculation M times. Accordingly, the memory for the calculation may be saved.

Figure 10:
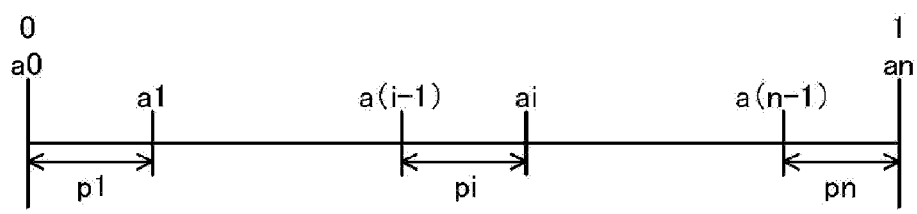
FIG. 10 is an explanatory view illustrating an exemplary determination of probability.

FIG. 10 is an explanatory view illustrating an example of a probability determination. More specifically, for example, the expected value calculation unit 405 generates (n−1) random numbers from zero (0) to one (1) according to the uniform distribution. The expected value calculation unit 405 sorts the random numbers in an ascending order and sequentially defines the sorted random numbers as a1 through a(n−1). The random number "a0" is set as zero (0) and the random number "an" as 1. Also, the expected value calculation unit 405 iterates the following Equation (3) from i=1 to i=n to obtain probabilities p1 through pn. The total value of probabilities p1 through pn is one (1).

$$pi = ai - a(i-1) \quad (3)$$

For example, when n=5, it is assumed that a1=0.2, a2=0.5, a3=0.7 and a4=0.8. Each of the probabilities p5 through p1 becomes p5=a5−a4=0.2, p4=a4−a3=0.1, p3=a3−a2=0.2, p2=a2−a1=0.3 and p1=a1−a0=0.2, respectively. The total value of probabilities p5 through p1 becomes one (1). Also, the expected value calculation unit 405 calculates the expected value Emc using the probabilities p5 through p1 and the difference Ec (e1 through e5). The expected value calculation unit 405 generates random numbers to determine the probability based on the random numbers and then, iterates a process in which an expected value is calculated M times. Accordingly, the expected value calculation unit 405 calculates M expected values of difference Emc.

Further, the GF calculation unit 406 calculates the GF between simulation and the candidate model P based on each expected value calculated by executing the calculation process the predetermined number of times.

Figure 11:
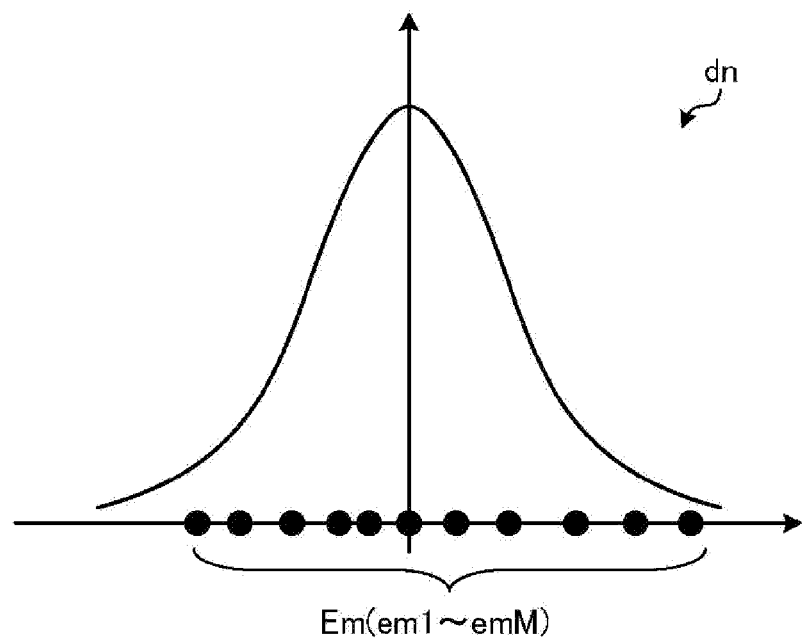
FIG. 11 is an explanatory view illustrating an exemplary distribution of expected values.

FIG. 11 is an explanatory view illustrating an example of a distribution of expected values. When the M is sufficiently large number, a distribution of the plurality of calculated expected values Em becomes the normal distribution according to the central limit theorem.

(Example 1 of Goodness of Fit)

Figure 12:
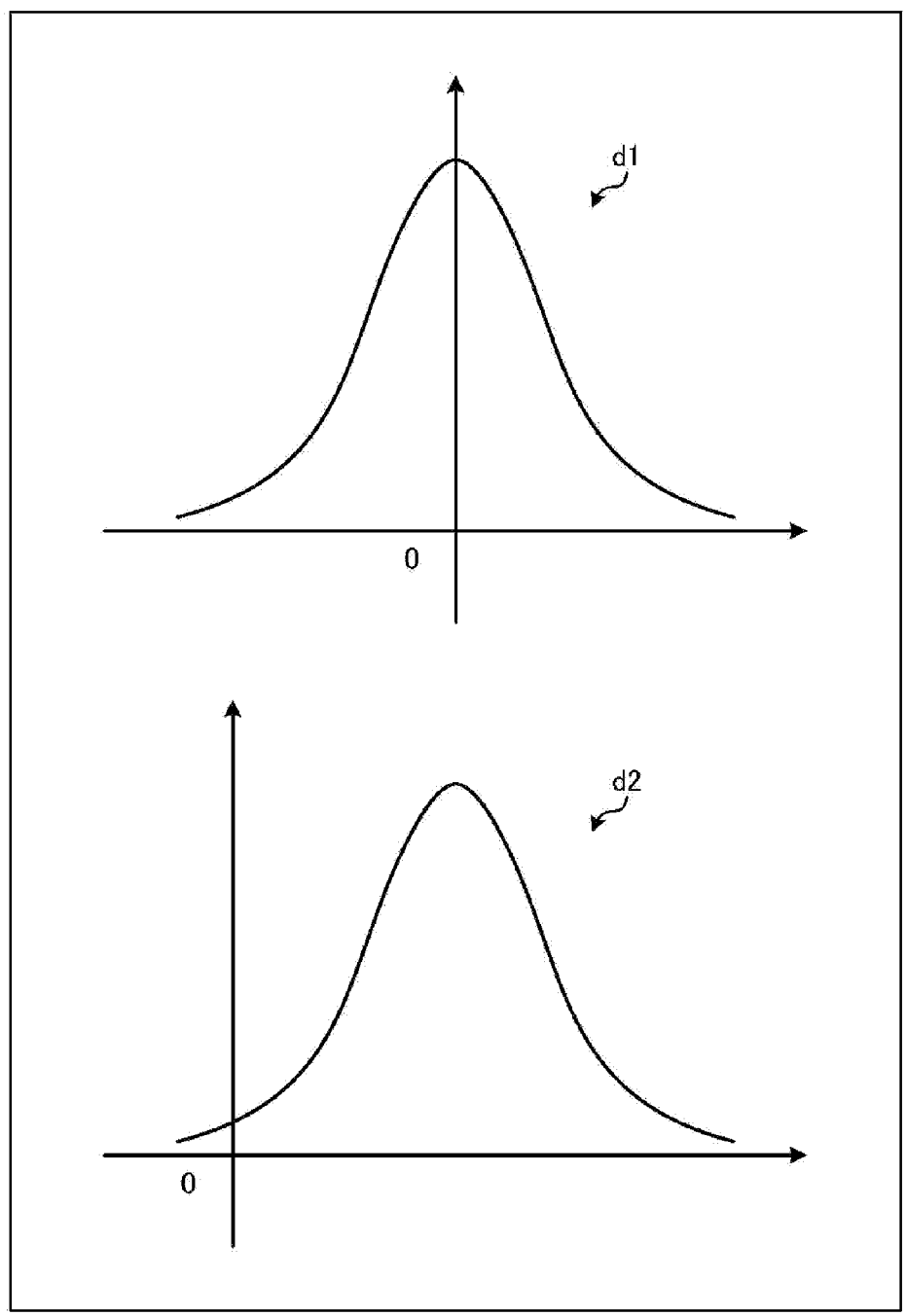
FIG. 12 is an explanatory view illustrating the high or low of an exemplary goodness of fit (GF).

FIG. 12 is an explanatory view illustrating the high or low of GF. The accuracy of the candidate model P becomes higher as the difference between the performance value obtained from a simulation and the performance value obtained by the candidate model P becomes closer to zero (0). Therefore, the accuracy of the candidate model P becomes higher as the normal distribution of the plurality of calculated expected values Em becomes closer to a normal distribution (0,σ).

For example, in FIG. 12, since the distribution d1 at an upper side becomes closer to the normal distribution N(0,σ) compared to the distribution d2 at a lower side, the candidate model P which follows the distribution d1 at the upper side has a higher GF to the simulation than the candidate model P which follows the distribution d2 at the lower side.

Accordingly, for example, the GF calculation unit 406 calculates the likelihood of the normal distribution of the plurality of calculated expected values to the normal distribution (0,σ) as the GF. Specifically, the GF calculation unit 406 calculates an average value μ of the expected values Em based on the following Equation (4).

$$\mu = \frac{1}{M}\sum_{j=1}^{M} emj \quad (4)$$

Also, the GF calculation unit 406 calculates a variance 6 of the expected value Em based on the following Equation (5).

$$\sigma^2 = \frac{1}{M-1}\sum_{j=1}^{M} (emj - \mu)^2 \quad (5)$$

Also, the GF calculation unit 406 calculates the GF using the variance 6 and the expected value Em based on the following Equation (6).

$$GF = -M\ln(\sqrt{2\pi}\,\sigma) - \frac{1}{2\sigma^2}\sum_{j=1}^{M} emj^2 \quad (6)$$

Further, when taking into account the complexity of the candidate model P, the GF calculation unit 406 may calculate the GF based on the following Equation (7).

$$GF = -M\ln(\sqrt{2\pi}\,\sigma) - \frac{1}{2\sigma^2}\sum_{j=1}^{M} emj^2 - 2k \tag{7}$$

(Example 2 of Goodness of Fit)

Further, the GF calculation unit 406 calculates the average value of the square of the expected value as the GF. In this GF, it is possible to determine how close to zero (0) the average value is. Specifically, the GF calculation unit 406 calculates the GF based on the following Equation (8).

$$GF = \frac{-1}{M} \times L_2(Em) = \frac{-1}{M} \times \sum_{j=1}^{M} emj^2 \tag{8}$$

The output unit 408 outputs the GF calculated by the GF calculation unit 406. Further, the determination unit 407 determines a model among the candidate model group 800 based on the GF. For example, the determination unit 407 determines the candidate model P having the highest GF as the model. Also, the output unit 408 outputs the result determined by the determination unit 407.

(Example of a Verification Support Processing Procedure)

Figure 13:
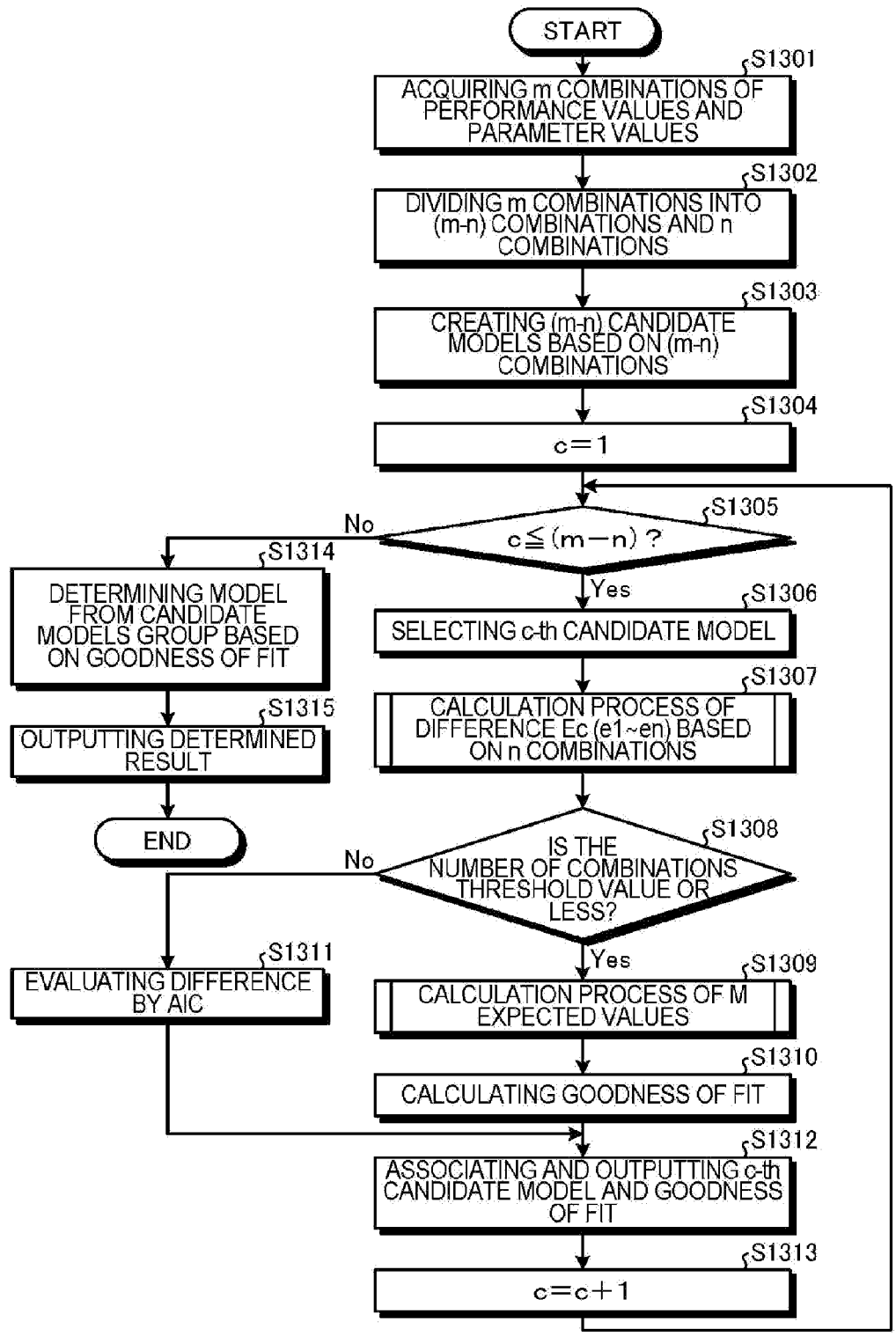
FIG. 13 is a flowchart illustrating an example of a verification support processing procedure by the verification support apparatus.

FIG. 13 is a flowchart illustrating an example of a verification support processing procedure by the verification support apparatus. The verification support apparatus 100 acquires the m combinations 501 of the performance value and the parameter value (step S1301). The verification support apparatus 100 divides m combinations into (m−n) combinations and n combinations (step S1302).

The verification support apparatus 100 creates (m−n) candidate models P based on (m−n) combinations 501 (step S1303). The verification support apparatus 100 sets c=1 (step S1304). The verification support apparatus 100 determines whether c is equal to or less than (m−n), that is, c≤(m−n) (step S1305). When it is determined that c≤(m−n) ("YES" at step S1305), the verification support apparatus 100 selects c-th candidate model (step S1306), and performs a calculation process of the difference Ec (e1 en) based on n combinations 501 (step S1307). The verification support apparatus 100 determines whether the number of combinations 501 is a threshold value or less (step S1308).

When it is determined that the number of combinations 501 is the threshold value or less ("YES" at step S1308), the verification support apparatus 100 performs a calculation process of M expected values (step S1309). The verification support apparatus 100 calculates the GF based on the expected values (step S1310). As described above, the verification support apparatus 100 calculates the GF based on any one of, for example, the Equations (4), (5), (6) and (8).

When it is determined that the number of combinations 501 is larger than the threshold value ("NO" at step S1308), the difference is evaluated by AIC (Akaike's Information Criterion) (step S1311). The verification support apparatus 100 associates and outputs the c-th candidate model P and the GF after step S1310 or step S1311 (step S1312). The verification support apparatus 100 increases c by 1, that is, sets c=c+1 (step S1313), and the verification support process goes back to step S1305.

When it is determined that c is larger than (m−n), that is, c>(m−n) ("NO" at step S1305), the verification support apparatus 100 determines a model from a candidate model group based on the GF (step S1314). The verification support apparatus 100 outputs determined result (step S1305), and a series of processes by the verification support apparatus 100 are ended.

Figure 14:
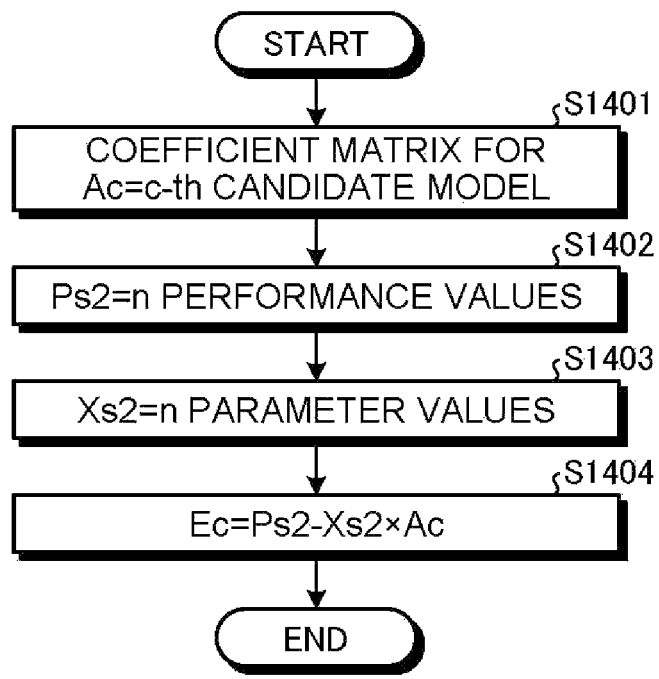
FIG. 14 is a flowchart illustrating the details of a difference calculation process illustrated in FIG. 13.

FIG. 14 is a flowchart illustrating the details of a difference calculation process illustrated in FIG. 13. The verification support apparatus 100 defines Ac=a coefficient matrix of c-th candidate model P (step S1401). Subsequently, the verification support apparatus 100 defines Ps2=n performance values included in n combinations 501 (step S1402). The verification support apparatus 100 defines Xs2=n parameter values included in n combinations 501 (step S1403). The verification support apparatus 100 sets Ec=Ps2−Xs2×Ac (step S1404), and a series of processing by the verification support apparatus 100 are ended.

Figure 15:
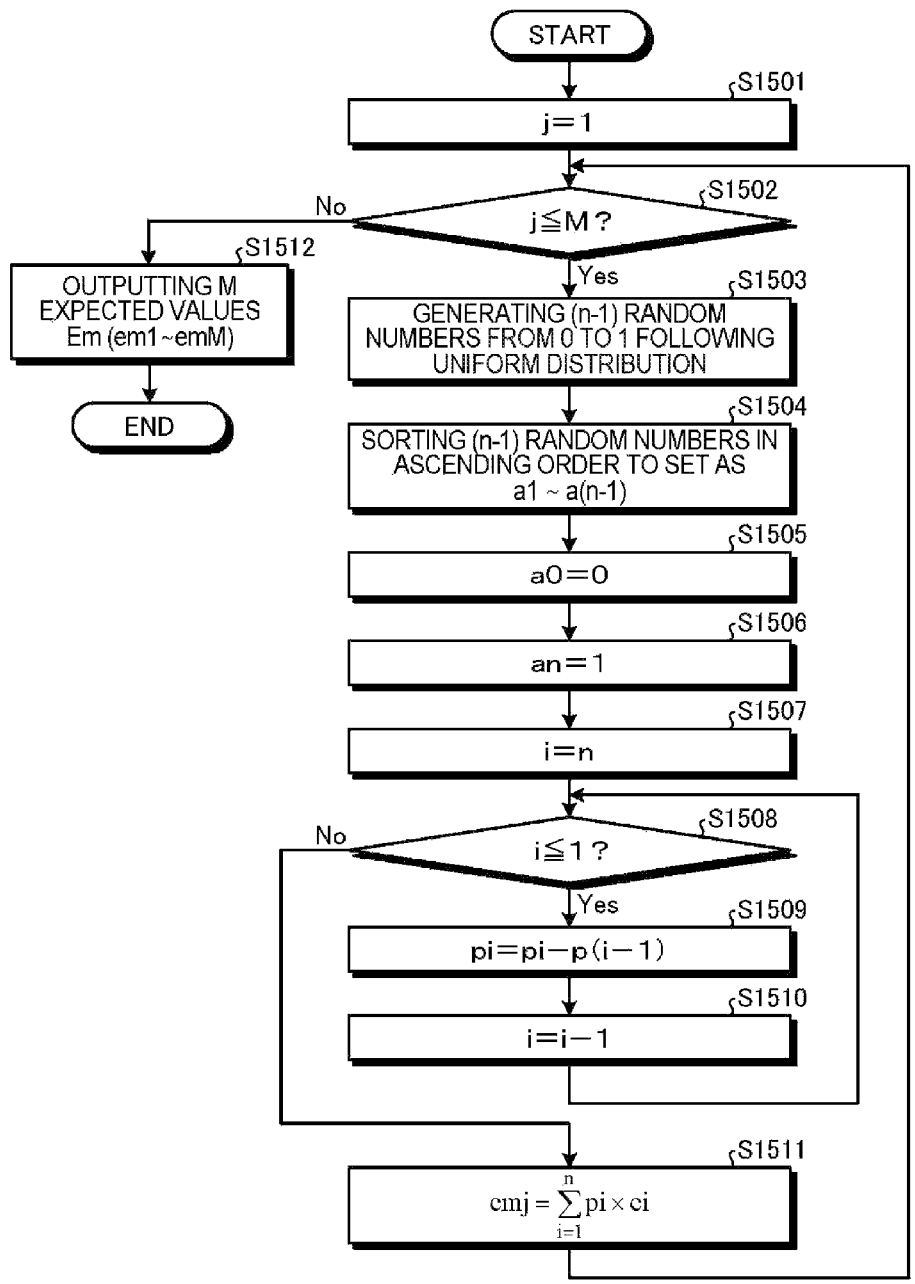
FIG. 15 is a flowchart illustrating the details of an expected value calculation process illustrated in FIG. 13.

FIG. 15 is a flowchart illustrating the details of an expected value calculation process illustrated in FIG. 13. The verification support apparatus 100 sets j=1 (step S1501). The verification support apparatus 100 determines whether j is equal to or less than M, that is, j≤M (step S1502). When it is determined that j≤M ("YES" at step S1502), the verification support apparatus 100 generates (n−1) random numbers from 0 to 1 according to the uniform distribution (step S1503). The verification support apparatus 100 sorts (n−1) random numbers in ascending order to set the (n−1) random numbers as a1 a(n−1), respectively (step S1504).

The verification support apparatus 100 sets a0=0 (step S1505). The verification support apparatus 100 sets an=1 (step S1506). The verification support apparatus 100 sets i=n (step S1507). The verification support apparatus 100 determines whether i is equal to or less than 1, that is, i≤1 (step S1508). When it is determined that i≤1 ("YES" at step S1508), the verification support apparatus 100 sets pi=pi−p(i−1) (step S1509). Also, the verification support apparatus 100 decrease i by 1, that is, sets i=i−1 (step S1510), and the expected value calculation process goes back to step S1508.

In the meantime, when it is determined that i is larger than one (1), that is, i>1 ("NO" at step S1508), the verification support apparatus 100 sets emj=a total value of pi×ei (where, i=1 to n) (step S1511), and the expected value calculation process goes back to step S1502. Further, when it is determined that j is larger than M, that is, j>M ("NO" at step S1502, the verification support apparatus 100 outputs M expected values Em (em1 through emM) (step S1512), and a series of processing by the verification support apparatus 100 are ended.

Further, the candidate model P in the embodiment may be a difference value model which indicates the difference value of performance prepared from the difference of performance of the circuit before and after the layout processing and the value of parameter of the post-layout circuit 302. For example, in the embodiment, the model which indicates the performance of the post-layout circuit 302 may be prepared from the difference value model having the highest GF and the function which indicates the performance of the pre-layout the circuit 301.

Figure 16:
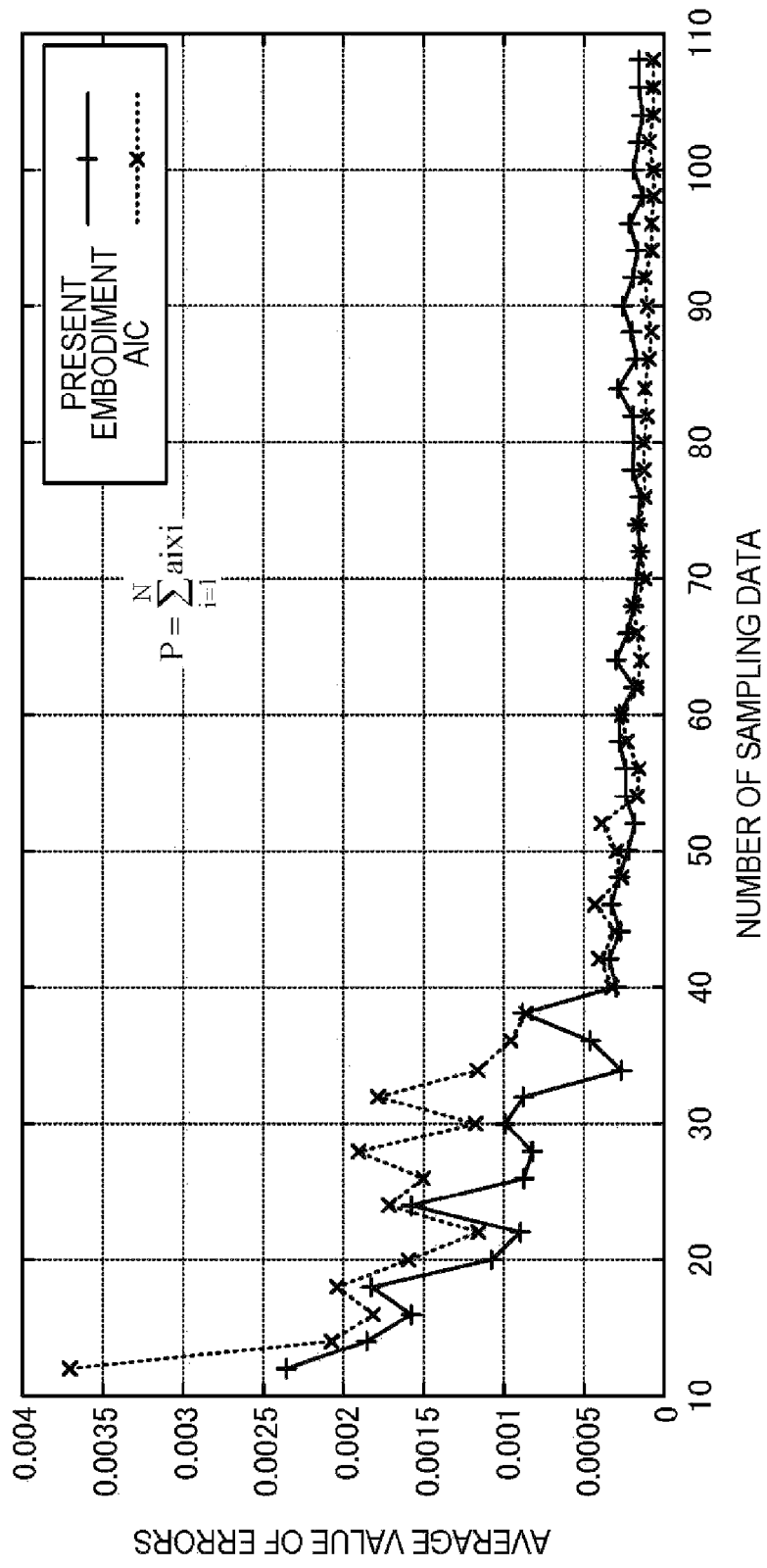
FIG. 16 is an explanatory view illustrating an exemplary error in evaluation by each of AIC (Akaike's Information Criterion) and the exemplary embodiment of the present disclosure.

FIG. 16 is an explanatory view illustrating an exemplary error in evaluation by each of the AIC and the embodiment. For example, the candidate model P for which a value of five (5) coefficients "a" is other than zero (0) among 100 coefficients "a" is given as an example. The number of sampling data is the number of performance values obtained from the simulation. In a case where the number of sampling data is small, an evaluation error for the candidate model P according to the embodiment becomes smaller than the evaluation error for the candidate model P by the AIC.

As described above, the verification support apparatus in the embodiment calculates the number of expected values of difference between the performance value obtained by the function and the performance value obtained from simulation more than the number of differences using the random probability to calculate the GF based on each expected value. Accordingly, even though the number of simulation runs is small, the function may be evaluated statistically. Accordingly, when the number of simulation runs is small, the accuracy of evaluation as to whether the function is suitable for simulation may be improved. As a result, the efficiency of evaluation may be improved. A total value of probabilities based on random numbers becomes one (1). Further, random numbers follow the uniform distribution. Accordingly, a situation where the probabilities having the same value occur several times may be prevented.

Further, the distribution of the expected value becomes the normal distribution. Therefore, the verification support apparatus calculates the GF based on statistics of the expected value distribution. Accordingly, it is possible to determine whether the average value of differences is zero (0) in the distribution of the expected value. Therefore, it is possible to detect the function having the distribution in which the average value of differences is closer to zero (0). Further, the verification support apparatus calculates the GF based on the average value of the square of the expected value. Accordingly, it is possible to detect the function having the average value of differences which is closer to zero (0).

In the meantime, the verification support method described in the embodiment may be implemented by executing a program prepared in advance using a computer, such as, for example, a personal computer or a workstation. The verification support program may be recorded in a computer readable recording medium such as a disk or USB (Universal Serial Bus) memory, and read from the computer readable recording medium to be executed. Further, the verification support program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A verification support method comprising:
  acquiring a plurality of different combinations of a physical variable value regarding variation in an integrated circuit manufacturing process and a performance value obtained from a simulation of a circuit based on the physical variable value;
  acquiring a functional relationship from which a performance value of the circuit is obtained by giving a parameter value to the functional relationship;
  calculating a difference between the performance value obtained by giving the physical variable value included in the combination to the acquired functional relationship and the performance value included in the combination regarding each of the plurality of acquired combinations;
  determining, executed by a computer, a probability based on random numbers regarding each of the plurality of combinations to execute a calculation process in which an expected value of the difference is calculated based on the determined probability and the calculated difference for a predetermined number of executions which is larger than a number of the plurality of combinations; and
  calculating a goodness of fit (GF) between the simulation and the functional relationship based on each expected value calculated by executing the calculation process the predetermined number of executions,
  wherein the physical variable value comprises at least one of electrical and physical properties of the circuit.

2. The verification support method according to claim 1, wherein the goodness of fit is a value based on statistics of the distribution for each calculated expected value.

3. The verification support method according to claim 1, wherein the goodness of fit is a value based on the average value of the square of each calculated expected value.

4. The verification support method according to claim 1, wherein a total of probabilities determined for each of the plurality of combinations becomes one (1).

5. The verification support method according to claim 1, wherein the random numbers follow a uniform distribution.

6. A verification support apparatus comprising:
  a combination acquisition unit configured to acquire a plurality of different combinations of a physical variable value regarding variation in an integrated circuit manufacturing process and a performance value obtained from a simulation of a circuit based on the physical variable value;
  a function acquisition unit configured to acquire a functional relationship from which a performance value of a circuit is obtained by giving a parameter value to the functional relationship;
  a difference calculation unit configured to calculate a difference between the performance value obtained by giving the physical variable value included in the combination to the functional relationship acquired by the function acquisition unit and the performance value included in the combination regarding each of the plurality of combinations acquired by the combination acquisition unit;
  an expected value calculation unit configured to determine a probability based on random numbers regarding each of the plurality of combinations and execute a calculation process in which an expected value of the difference is calculated based on the determined probability and the difference calculated by the difference calculation unit for a predetermined number of executions which is larger than a number of the plurality of combinations; and
  a goodness of fit calculation unit configured to calculate a goodness of fit (GF) between the simulation and the functional relationship based on each expected value calculated by executing the calculation process by the expected value calculation unit the predetermined number of executions,
  wherein the physical variable value comprises at least one of electrical and physical properties of the circuit.

7. A non-transitory computer-readable recording medium storing a verification support program that, when executed, causes a computer to perform a verification support method, the verification support method comprising:

acquiring a plurality of different combinations of a physical variable value regarding variation in an integrated circuit manufacturing process and a performance value obtained from a simulation of a circuit based on the physical variable value;

acquiring a functional relationship from which a performance value of the circuit is obtained by giving a parameter value to the function;

calculating a difference between the performance value obtained by giving the physical variable value included in the combination to the acquired functional relationship and the performance value included in the combination regarding each of the plurality of acquired combinations;

determining a probability based on random numbers regarding each of the plurality of combinations to execute a calculation process in which an expected value of the difference is calculated based on the determined probability and the calculated difference for a predetermined number of executions which is larger than a number of the plurality of combinations; and calculating a goodness of fit (GF) between simulation and the function based on each expected value calculated by executing the calculation process the predetermined number of executions, wherein the physical variable value comprises at least one of electrical and physical properties of the circuit.

* * * * *